United States Patent [19]

Saito et al.

[11] 4,198,457
[45] Apr. 15, 1980

[54] MOLDED ARTICLE HAVING STEREOSCOPIC DECORATIVE PATTERN AND FABRICATION PROCESS THEREFOR

[75] Inventors: Tadao Saito; Takamitsu Nozawa; Nobuo Yamanaka, all of Tokyo, Japan

[73] Assignee: Yoshino Kogyosho Co., Ltd., Tokyo, Japan

[21] Appl. No.: 547,812

[22] Filed: Feb. 7, 1975

[30] Foreign Application Priority Data

Feb. 12, 1974 [JP] Japan .................................. 49-17308
May 28, 1974 [JP] Japan .................................. 49-59892

[51] Int. Cl.² .............................................. B32B 3/30
[52] U.S. Cl. .................................. 428/161; 264/162; 428/164; 428/409
[58] Field of Search ............... 428/913, 187, 164, 161, 428/172, 13, 409; 264/162

[56] References Cited

U.S. PATENT DOCUMENTS

| 1,638,529 | 8/1927  | Cook            | 264/162 |
| 2,651,079 | 9/1953  | Michaelson et al.| 264/162 |
| 3,287,481 | 11/1966 | Trojan et al.   | 264/162 |
| 3,437,548 | 4/1969  | Ayers           | 264/162 |

FOREIGN PATENT DOCUMENTS 1924536 11/1970 Fed. Rep. of Germany ........... 264/162

Primary Examiner—Stanley S. Silverman

[57] ABSTRACT

Herein disclosed is a molded article of a synthetic resin having on its smooth surface a decorative pattern which is viewable as a stereoscopic image from the outside. The molded article includes a substratum which forms the general structure of the molded article and which is molded of a material consisting essentially of a synthetic resin and an additive. The article further includes a decorative surface layer which is formed on the substratum in a manner to provide a generally smooth finish. This decorative surface layer is composed both of a decorative pattern portion figured by the flow marks inside of the trace of a relief pattern, which has once been formed during the molding process of the article, and of a ground portion. The decorative surface layer is made during the molding process integrally with and of the same material as that of the substratum. Thus, the decorative pattern portion can appear stereoscopic, although having a smooth surface, just in the form of the relief pattern as a result of the shading due to substantially radial reflection of the light incident upon the flow marks. In a modification, the molded article may have at least one covering layer which is formed by a second molding process of a similar material but has a different appearance. Then, the article thus modified has a stereoscopic decorative pattern which can enjoy multiple appearances. Also disclosed is a process for fabricating such a molded article as above.

9 Claims, 13 Drawing Figures

MOLDED ARTICLE HAVING STEREOSCOPIC DECORATIVE PATTERN AND FABRICATION PROCESS THEREFOR

The present invention relates to a molded article of a synthetic resin having on its surface a decorative pattern such as letters or patterns, and to a process for fabricating the molded article.

For a container of a highclass cosmetic including its cap and a compact, an excellent outer shape suitable for its expensive content is desired, and at the same time a beautiful ornamentation suitable for the excellent outer shape is needed. Generally speaking, these desire and need have been conventionally satisfied partially with a print on the outer surface of a molded container or with a relief, namely, convex or concave decorative patterns on the outer surface. In the former technique, however, it is disadvantageous that the obtained print is liable to fall or peel off, and that the print cannot offer apparently more than a flat ornamentation. In the latter technique, on the other hand, it is disadvantageous that dusts are liable to collect in the concave portions of the decorative patterns, and that the dusts having resultantly sticked thereto will lessen the desired ornamental effects. It is, moreover, difficult to apply an additional decoration such as that according to the silk screen printing or the hot stamping to the general surface including the decorative patterns. This means that the latter technique cannot enjoy more than its intrinsic ornamentation.

These disadvantages can be obviated by the double molding method, in which the decorative patterns are formed on the intermediate face of the molded article. According to this method, more specifically, the article is composed of two layers, of which an inner layer has its outer surface formed with the decorative patterns and covered with a transparent outer layer. This construction arrangement can prevent any dust or the like from sticking to the convex or concave portion of the decorative patterns. Since, moreover, the stereoscopic patterns are protected by the transparent outer layer, they can be made free from any damage nor stain, and it is quite easy to remove the stain which has sticked to the smooth outer surface of the transparent outer layer. Thus, the stereoscopic patterns according to the double molding method can maintain their beautiful appearance for a long time.

However, this double molding method cannot obviate its intrinsic serious drawback. More specifically, since the molding process has to be accomplished twice including one for fabricating the inner layer with the outside decorative patterns and the other for fabricating the transparent cover layer, the decorative patterns are subject during the fabricating process of the cover layer to deformation and/or wear due to the high pressure and temperature of the modling material. The extent of the deformation and wear is so increased, especially when the roughness of the decorative patterns is small, that the sharpness of the patterns is completely damaged. Since, moreover, the molding materials for the inner and outer layers are a synthetic resin of similar type, the decorative patterns of the inner layer will be molded and deformed by the hot material which is heated during the injection molding process of the outer layer. Accordingly, the variation in the obtainable pattern is so highly restricted as to make it technically impossible to produce such a complicated pattern as includes two- or three-dimensional curves. Thus, the double molding method cannot be expected to attain a commercial success.

Another difficulty is found to reside in the necessity for two kinds of molds respectively for the inner and outer layers, because the molding process has to be carried out twice. Moreover, the two-layer structure will accordingly increase the thickness of the molded article in comparison with the article of a single layer, thus making the double molding method unsuitable for fabricating such a portable article, for example, a compact or a container for a cosmetic, as is required to have a relatively thin structure. The inevitably thickened structure, on the other hand, will be accompanied by considerable increase in production cost.

It is, therefore, an object of the present invention to provide a molded article of a synthetic resin having on its smooth surface a decorative pattern which is viewable as a stereoscopic image from the outside.

Another object of the present invention is to provide a molded article of the above type which is fabricated by a single molding process.

Still another object of the present invention is to provide a molded article which is fabricated by multiple molding processes but which has such a stereoscopic decorative pattern on its smooth surface as can enjoy multiple appearances.

A further object of the present invention is to provide a method for fabricating by a single molding process a molded article of a synthetic resin having on its smooth surface a decorative pattern which is viewable as a stereoscopic image from the outside.

Still further object of the present invention is to provide a method for fabricating by multiple molding processes a molded article which has such a stereoscopic decorative pattern on its smooth surface as can enjoy multiple appearances.

According to an aspect of the present invention, there is provided a molded article having a decorative appearance which is viewable as a stereoscopic image from the outside. The molded article comprises a substratum forming the general structure of the molded article and molded of a material, which consists essentially of a synthetic resin and an additive; and a decorative surface layer formed on the substratum in a manner to provide a generally smooth finish and composed both of a decorative pattern portion figured by the flow marks inside of the trace of a relief pattern, which has once been formed during the molding process of the molded article, and of a ground portion occupying the remaining portion of the decorative surface layer, so that the decorative pattern portion can appear stereoscopic just in the form of the relief pattern as a result of the shading due to substantially radial reflection of the light incident upon the flow marks.

According to another aspect of the present invention, there is provided a process for fabricating a molded article having a decorative appearance which is viewable as a stereoscopic image from the outside. The process comprises the steps of prefabricating by an injection molding method an object of a material, which consists essentially of a synthetic resin and an additive, in a manner to have a relief pattern on its surface, planing away the resultant relief pattern in a manner to turn the general surface of the object smooth so as to figure a decorative pattern on the resultant smooth surface by the flow marks inside of the trace of the relief pattern, and polishing the planed surface of the object, so that the decorative pattern can appear stereoscopically on the polished surface of the molded article just in the form of the relief pattern as a result of the shading due to substantially radial reflection of the light incident upon the flow marks.

Other objects and advantages of the present invention will now be described with reference to the drawing, in which.

Figure 1:
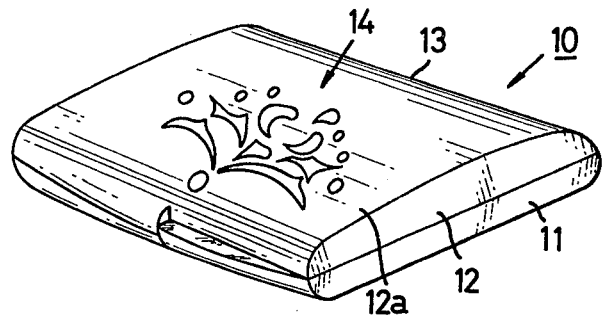
FIG. 1 is a perspective view showing a compact which exemplifies the present invention.

Referring now to FIG. 1, the present invention will be described in conjunction with a compact which is generally indicated at reference numeral 10. Designated respectively at reference numerals 11 and 12 are a compact main body and a cover, which are hinged at their rear portion 13 to each other by means of a pin. As shown, a stereoscopic decorative pattern 14 is formed on a center area of the outer surface of the cover 12. This surface 12a of the cover 12 is generally smooth and glossy but has a small curvature. In other words, although the pattern 14 appears stereoscopic, it is actually displayed on or beneath the cover surface 12a. The stereoscopic pattern 14 is not displayed by printing on the outer or inner surface of the cover 12 nor by forming a relief pattern on the outer surface but by the flow marks of the molding material, which are formed in a mold during the injection molding process. These flow marks are formed inside of the trace of a relief pattern, which has once been formed in a corresponding recessed pattern of the mold, and are made to appear by planning and polishing the general surface of the molded article. The flow marks can be artificially made to appear clear or deep to a desired extent as an apparently stereoscopic decorative pattern. The appearance itself of the pattern may be two-dimentional or three-dimentional, if desired.

More detailed discussion of the formation of the stereoscopic pattern due to the flow marks of the molten material in a mold for the injection molding process will now be made in the following.

The molding material is prepared either by admixing one synthetic resin, which is selected from the group including a polypropylene, polyethylene, styrol, polycarbonate and acryl, with another synthetic resin of the same group but of a different appearance, or by admixing one synthetic resin of the same group with an additive such as a colorant, copper powders, aluminium powders or mica powders. The synthetic resin is desired to have a thermoplastic property and to produce an article having a high hardness. From this consideration, the most suitable material is polycarbonate, a mixture resin of acryl, styrol and acryl.

Figure 2:
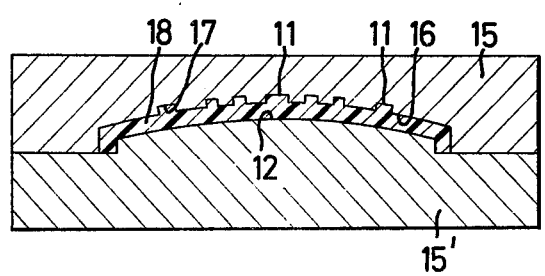
FIG. 2 is a sectional view showing a mold which is to be used in the injection molding process.
Figure 3:
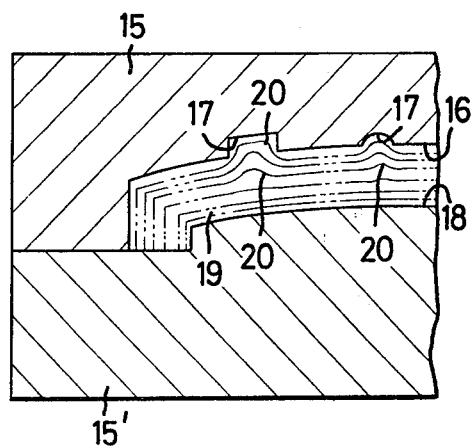
FIG. 3 is an enlarged sectional view showing a portion of the mold of FIG. 2.

Turning now to FIGS. 2 and 3, designated at reference numerals 15 and 15' are molds for the injection molding process, of which the upper mold 15 is formed with an inner surface 16 for defining a cavity together with the lower mold 15'. This inner surface 16 is, as shown, formed with recessed letters or patterns which correspond to the desired decorative pattern. Since, in this instance, the stereoscopy of the decorative pattern is found to be determined by the width and depth of the recessed portion 17, the portion of the recessed letters or patterns, which is to be displayed two-dimentional, is formed to have accordingly a thin and shallow recess, and vice versa.

The two molds 15 and 15' are then closed to form a cavity 18, into which the hot molding material 19 having the above composition is injected. Thus, the molding material 19 will once flow into the recessed portion 17, from which a portion of the material having a lower fluidicity will migrate. As a result, the flow marks 20 are formed dense in the recessed portion 17, as better shown in FIG. 3. It should be noted here that the remaining portion of the material will not have its migration velocity deteriorated to produce few flow marks on the ground portion excepting the recessed portion 17.

Figure 4:
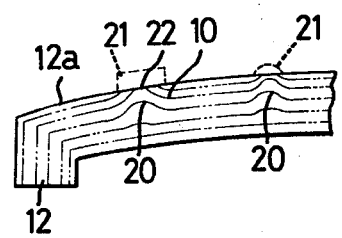
FIG. 4 is a partial section showing a molded article according to the present invention.

On the surface 12a of the cover 12 thus prefabricated, therefore, there is formed a relief pattern 21 which corresponds to the recessed portion 17 of the mold 15. This relief pattern 21 as a whole forms the letters and patterns similar to those which are formed concave in the cover 12. The relief pattern 21 is then planed away to turn the general surface of the cover 12 smooth. The cover surface 12a including such a trace 22 of the relief pattern 21 as is formed as a result of the planing treatment is then polished so that the flow marks 20 inside of the trace 22 may appear as the desired stereoscopic decorative pattern. This polishing treatment is carried out to such an extent that the general surface of the cover 12 can have a considerable gloss. It should be appreciated here that, since the flow marks 20 are formed, as shown in FIG. 4, in the shape of a plateau whose height is determined in dependence upon the depth of the recessed portion 17, the decorative pattern figured by the flow marks 20 can appear as a stereoscopic image likewise of the relief portion 21 which has been planed away.

Figure 5A:
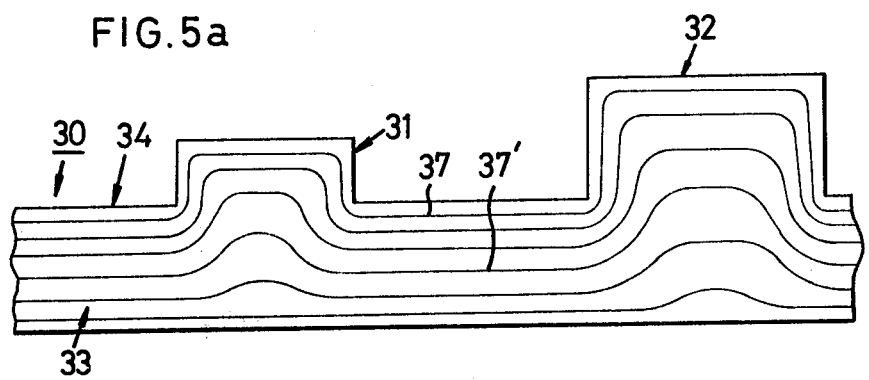
FIGS. 5a and 5b are enlarged diagrammatical sections showing the arrangements of flow marks for circular and rectangular relief patterns, respectively, with and without the two relief patterns.
Figure 5B:
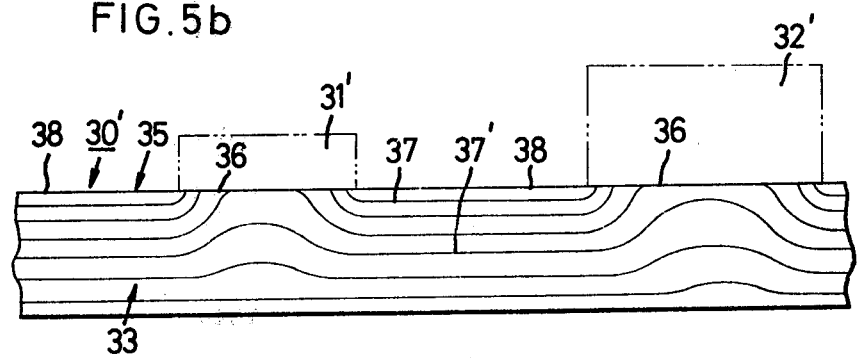

The decorative pattern thus figured on the generally smooth surface is displayed stereoscopic as if it were embeded in the surface layer of the molded article. The reason why such a stereoscopic appearance can be obtained will now explained with reference to FIGS. 5a to 7b. In FIGS. 5a and 5b, reference numerals 30 and 30' indicate an article immediately after the molding process and the molded article after it is planed and polished, respectively. The molded article 30 is formed with a circular relief pattern 31 and a rectangular relief pattern 32, for illustrative purposes only. For simplicity of explanation, moreover, it will be assumed that the molded article 30 includes a substratum 33 and two relief patterns 31 and 32 projecting from the surface 34 and that the finished article 30' includes the substratum 33 and an imaginary surface layer 35. This surface layer 35 is composed both of a decorative pattern portion 36, which is figured by the flow marks 37 and 37' inside of the traces 31' and 32' of the relief patterns 31 and 32, and of a ground portion 38 which occupies the remaining portion of the surface layer 35. In this simplified embodiment as described in connection with FIGS. 1 to 4, the surface layer 35 is an intrinsic layer, which is made integrally with and of the same material as that of the substratum 33, and accordingly has no difinite boundary from the substratum 33.

With closer reference to FIG. 5a, the arrangements of the flow marks 37 and 37' formed during the molding process will be discussed in detail, as follows. The upper flow marks 37, which are positioned closer to the surface 34, are formed such that the molding material proceeds horizontally along the surface 34, rises at the relief pattern 31 or 32 along the standing side wall of the mold, turns its proceeding direction horizontally along the top wall of the mold, falls down along the opposite side wall and proceeds again horizontally along the surface 34. Thus, the rising or falling inclination of the flow of the molding material is steep at the upper flow marks 37 and gentle at the lower flow marks 37' which are positioned inside of the substratum 33. As better seen from FIG. 5b, the relief patterns 31 and 32 are removed by planing and subsequent polishing treatment along the surface 34, so that the surface layer 35 is composed of the ground portion 38 having parallel flow marks and of the decorative pattern portion 36 having rising and falling flow marks but the surface layer 35 itself is generally smooth.

The decorative pattern portion 36 can be viewed, although it extends smoothly from the surrounding ground portion 38, as if it projected therefrom with the height depending upon the planed and polished relief pattern 31 or 32. More specifically, in the case where the planed relief pattern was a low and thin line, the resultant pattern portion 36 is seen as a relatively flat line. In the case, however, where the planed relief pattern had a projection or height, for example, of about 0.2 mm, it is seen as a pattern having substantially the same projection although it is in fact flat. This remarkable phenomenon is considered to result from the shading due to substantially radial reflection of the light incident upon the flow marks.

Figure 6:
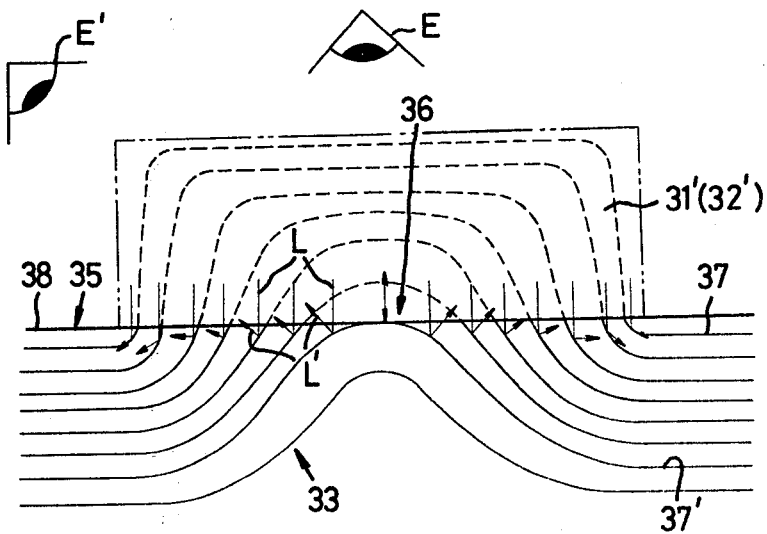
FIG. 6 is an explanatory sectional view explaining why the planed smooth trace of the flow marks appears stereoscopic.

Turning now to FIG. 6, the reason why the planed smooth trace of the flow marks can appear stereoscopic will be explained. In FIG. 6, like reference numerals will indicate like portions of FIG. 5a and 5b. In this explanatory view, moreover, the dotted lines will indicate the configuration of the removed relief pattern 31' or 32', and the broken lines will indicate the flow marks inside of the same. For simplicity of explanation only, it will be assumed that the incident parallel light, which is shown by arrows L, comes from right above of FIG. 6. Indicated by reference letters E and E' are eyes of an observer, which are positioned at a position right above the decorative pattern portion 36 and at an upper lefthand corner of the same, respectively.

Figure 7A:
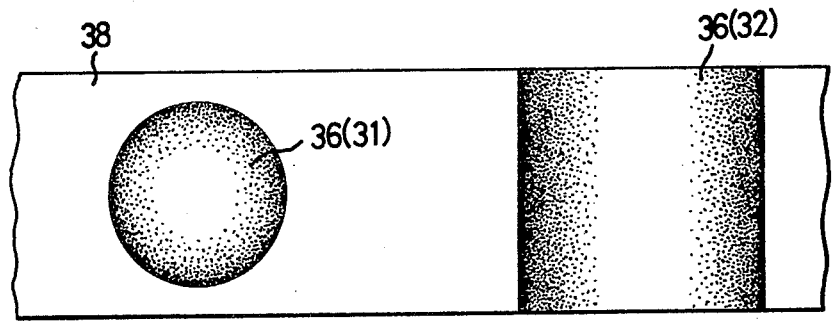
FIGS. 7a and 7b are top plan views showing the actual appearances of the planed circular and rectangular relief patterns of FIG. 5b, respectively, for the cases where the incident light comes from right above and from the upper lefthand corner of FIG. 5b.

Since the upper flow marks 37 have their inclinations gentler toward the center of the decorative pattern portion 36, the light L' reflected thereon are oriented substantially radially, from the macroscopic standpoint, as shown. Here, it should be noted that the usual surface reflection is omitted from consideration for simplicity. Such reflections as effected on the respective flow marks 37 are prominent in the case where the modling material contains metal powders as the additive, as will be easily understood. For an observer having his eyes positioned at E, therefore, the decorative pattern portion 36 is seen to have its center portion brighter and its edge portions darker. The transition of brightness or shading of the pattern portion 36 is found to be continuously changed from its center to its edge portions. The absolute level of this brightness is naturally dependent upon the intensity of the coming light but need not be taken into consideration, because the light is assumed to come from right above uniformly. As a result, the observer with the eyes E can enjoy the top plan view of the actual appearance of FIG. 5b, as seen in FIG. 7a. In this figure, the lefthand shading indicates the decorative pattern portion 36 corresponding to the circular relief pattern 31 while the righthand shading indicates the pattern portion 36 corresponding to the rectangular relief pattern 32.

Figure 7B:
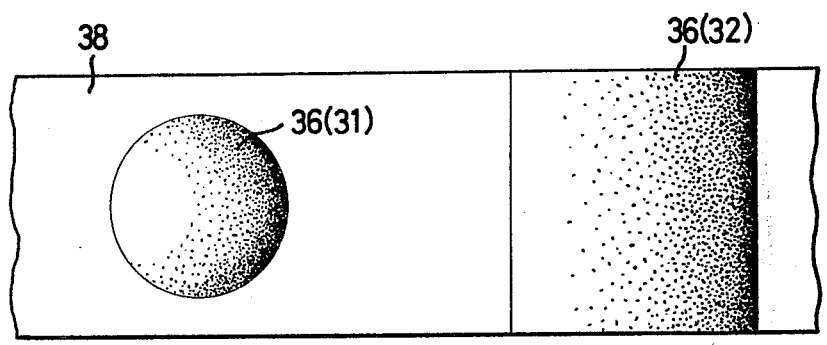

Such shading is also found to vary with the variation in the angle of inclination of the coming light. For example, if the incident light comes from the upper lefthand corner of FIG. 6, then the resultant top plan view corresponding to FIG. 7a will be changed into that as shown in FIG. 7b. This change can be understood in view of FIG. 6 and in consideration of the case where the observer has his eyes at a position as shown by E'. This analogy is carried out for simplicity of illustration only and can be supported by the so-called "low of reflection".

As discussed in the above, the shading due to the reflection of the coming light on the flow marks is considered similar to that of the original relief pattern with its edges being removed. As a result, the planed smooth trace of the removed relief pattern can appear stereoscopic just in the form of the original relief pattern although its shape itself is slightly rounded.

Figure 8:
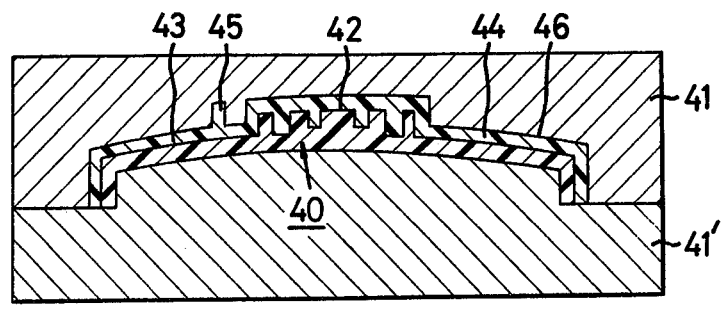
FIG. 8 is similar to FIG. 2 but shows a section of a mold to be used in another embodiment of the present invention for a second molding process of a covering layer.

Turning now to FIG. 8, there is shown another embodiment of the present invention, in which the molded article or compact 40 as has been obtained by the injection molding process of FIG. 2 is placed in a cavity between two molds 41 and 41' for the secondary injection molding process. Thus, the molded article 40 is an intermediate product and has a relief pattern 42 and a surface layer 43. After the secondary molding process, a covering layer 44 is formed on the relief pattern 42 and surface layer 43 of the molded article 40. The covering layer 44 thus formed may have a relief pattern on the relief pattern 42 of the underlying article 40, and the illustrated embodiment has a simple relief pattern. However, the covering layer 44 is formed additionally with an isolated relief pattern 45 on the surface layer 43. Since the molded article 40 having the covering layer 44 is then subjected to the subsequent planing and polishing treatments, the covering layer 44 will act as the decorative surface layer 35 defined in the discussion of FIG. 5b. Although the height of the underlying relief pattern 42 may be partially different, it should be noted that even the lowermost projection of the relief pattern 42 has to be positioned at such a level as to project from the surface 46 of the covering layer 44. This is because the particular surface 46 will become the ground portion 38 as has also been defined in the discussion of FIG. 5b, after the article 40 with the covering layer 44 is subjected to the finishing treatment. The covering layer 44 may be made of a similar material to that of the underlying article 40 but should have a different appearance such as color.

Figure 9A:
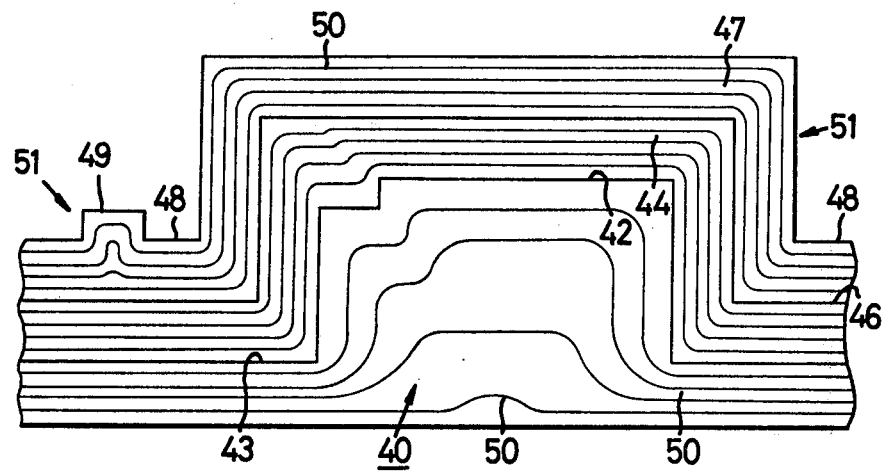
FIGS. 9a and 9b are enlarged sectional views showing the arrangements of flow marks of a relief pattern inside of a molded article having two covering layers, respectively, with and without the relief pattern.

If desired, another covering layer 47 may be formed on the covering layer 44 in a similar manner by the tertially injection molding process, as seen from FIG. 9a. Then, the first covering layer 44 will become an intermediate layer sandwiched between the article 40 and the second covering layer or outermost layer 47, as will be easily understood. As a result of this modification, the outermost layer 47 will act as the decorative surface layer 35 of FIG. 5b and its surface 48 will become the ground portion 38 of the same figure. An isolated relief pattern 49 may also be formed on the surface 48 of the outermost layer 47. In this modification, moreover, even the lowermost projection of the relief pattern 42 has to be so positioned as to project from the surface or ground portion 48 of the outermost covering layer 47. The material of this outermost layer 47 may be similar to those of the two underlying layers 44 and 40 but has to be able to display a different appearance. Here, reference numeral 50 indicates flow marks formed inside of the three layers 40, 44 and 47. A further overlying layer may be formed on and on if it is desired to obtain a highly complex pattern.

Figure 9B:
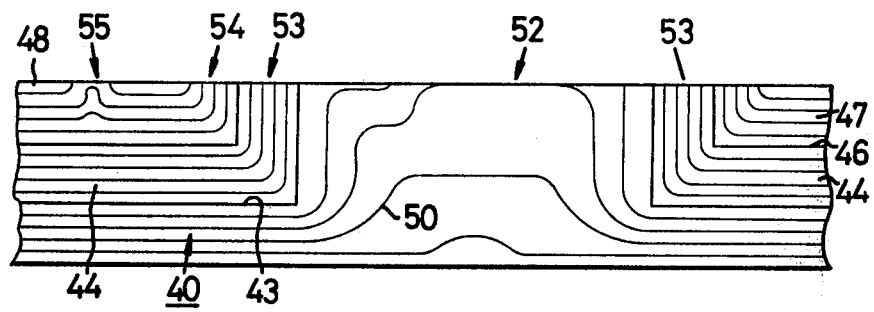
Figure 9C:
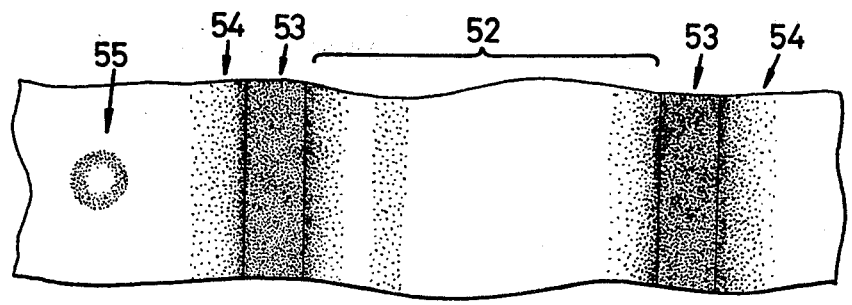
FIG. 9c is a top plan view showing the actual appearance of the planed relief pattern of FIG. 9b.

At the subsequent step, the article thus molded is subjected to the planing process to remove therefrom its portion which is generally shown at numeral 51 to project from the surface or ground portion 48 of the outermost layer 47. Then, the article thus planed is subjected to the polishing treatment. The resultant article is illustrated in section and in top plan view, respectively, in FIGS. 9b and 9c. In these two figures, reference numerals 52, 53, 54 and 55 indicate the traces of the relief patterns of the lowermost layer 40, of the intermediate layer 44 and of the outermost layer 47, and of the isolated relief pattern 49, respectively. The actual appearance of FIG. 9c is considered self-explanatory from the discussion conducted in conjunction with FIGS. 5a to 7b, and as such being the case its repeated discussion is omitted here.

As has been described in the beforehand, a molded article according to the present invention can have on its smooth surface a decorative pattern which is viewable as a stereoscopic image from the outside. The molded article of the invention can also be composed of multiple layers which have their pattern portions exposed to the outside. If, therefore, the multiple layers have different appearances such as colors, the resultant article can enjoy accordingly multiple appearances. If, moreover, the heights of the original relief patterns of the respective layers are made various, the degree of stereoscopic appearance in the decorative pattern coming from one original relief pattern can be selectively varied. It should also be appreciated that the obtained decorative pattern is figured on the smooth surface of the article by such flow marks of the molding material as are formed inside of the trace of the original relief pattern or patterns. From these features, the decorative pattern obtained according to the present invention can be free from falling or peeling off from the article surface, which is often experienced in the conventional printing method. Since, moreover, there is no roughness on the article surface, the decorative pattern can also be free from any attack of dusts. On the other hand, since the molded article of the single layer type can be fabricated by a single molding process according to the present invention, the thickness of the article can be materially reduced, and a mold of only one kind can accomplish the molding process, thus reducing considerably the production cost.

Here, it should be noted that the reason why synthetic resins of different kinds are admixed to prepare the molding material or why a colorant or the like is blended as an additive into a synthetic resin for the same purpose is to make the flow marks inside of the trace of the convex pattern clearer. In other words, the molding material consisting of a single synthetic resin could not form the desired flow marks.

The present invention can be applied to a variety of molded articles including the afore-mentioned compact or the like, a container for a cosmetic such as a lipstick, a button, a pendant and a decorative building sheet, if they are fabricated by the injection molding method. Thus, the present invention can be used in enhancing ornamentation of such various articles.

What is claimed is:

1. A molded article having a decorative appearance which is viewable as a stereoscopic image from the outside, comprising a substratum forming the general structure of said molded article and molded of a single monolithic material which comprises a synthetic resin selected from the group consisting of polypropylene, polyethylene, styrol, polycarbonate and acryl and an additive selected from the group consisting of a colorant, copper powders, aluminum powders, mica powders, and said synthetic resins;

a decorative pattern formed on the surface of said substratum in a manner to provide a generally smooth finish;

the decorative pattern portion configured by the flow marks of the molded material both approaching and intersecting said substratum surface inside of the trace of a predetermined pattern;

the flow marks having been formed during the molding process of said molded article;

an outer layer molded on said substratum and of a material which comprises one of said synthetic resins and one of said additives and has an appearance different from that of said substratum, in a manner to provide a generally smooth finish, said outer layer including a decorative pattern portion constituting at least partially the first-named decorative pattern portion and configured by the flow marks inside of the trace of a second predetermined pattern, which is formed during the molding process of said outer layer, the lowermost projection of the relief pattern of said substratum being positioned at such a level as to project from the outer surface of said outer layer, whereby the two coexisting decorative pattern portions can appear stereoscopic, respectively, just in the form of the two patterns as a result of the shading due to substantially radial reflection of the light incident upon said flow marks.

2. A molded article according to claim 1, wherein the decorative pattern portion of said outer layer has at least one part thereof located at a position isolated from the decorative pattern portion of said substratum.

3. A molded article according to claim 1, wherein the patterns of the two decorative pattern portions have partially different projection levels originally upon completion of their respective molding processes.

4. A molded article according to claim 1, further comprising at least one intermediate layer molded between said substratum and said outer layer and of a material which consists essentially of one of said synthetic resins and one of said additives and has an appearance different from those of the other two layers, said intermediate layer being composed both of a decorative pattern portion constituting at least partially the first-named decorative pattern portion and configured by the flow marks inside of the trace of a third predetermined pattern, which is formed during the molding process of said intermediate layer, the lowermost projection of the relief patterns both of said substratum and of said intermediate layer being positioned at such a level as to project from the outer surface of said outer layer, whereby at least three coexisting decorative pattern portions can appear stereoscopic, respectively, just in the form of the corresponding patterns.

5. A molded article according to claim 1, wherein said additive consists of a colorant so as to make said flow marks clearer.

6. A molded article according to claim 1, wherein said additive consists of a powdered material having a metallic luster so as to make said flow marks clearer.

7. A molded article according to claim 1, wherein said additive consists of one of said synthetic resins so as to make said flow marks clearer.

8. A molded article according to claim 4, wherein the decorative pattern portion of said intermediate layer has at least one part thereof located at a position isolated from the decorative pattern portions both of said substratum and of said outer layer.

9. A molded article according to claim 4, wherein the patterns of the three decorative pattern portions have partially different projection levels originally upon completion of their respective molding processes and prior to any grinding process.

* * * * *